(12) United States Patent
Jacob

(10) Patent No.: US 8,579,037 B2
(45) Date of Patent: Nov. 12, 2013

(54) METHOD AND APPARATUS FOR CONTROLLED BIDIRECTIONAL MOVEMENT OF AN OILFIELD TOOL IN A WELLBORE ENVIRONMENT

(75) Inventor: Gregoire Jacob, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 274 days.

(21) Appl. No.: 12/871,566

(22) Filed: Aug. 30, 2010

(65) Prior Publication Data

US 2011/0048801 A1 Mar. 3, 2011

(30) Foreign Application Priority Data

Aug. 31, 2009 (EP) .................................... 09290658

(51) Int. Cl.
*E21B 23/01* (2006.01)
*E21B 4/18* (2006.01)

(52) U.S. Cl.
USPC ..... 166/382; 166/212; 166/241.5; 166/255.1; 175/45; 175/99

(58) Field of Classification Search
USPC ................ 175/45, 24, 76, 98, 99, 170, 325.1, 175/325.5; 166/206, 21, 24, 216, 217, 166/241.1, 241.5, 241.6, 255.1, 382
See application file for complete search history.

(56) References Cited

U.S. PATENT DOCUMENTS

| | | | |
|---|---|---|---|
| 2,843,459 A | 7/1958 | Meiklejohn | |
| 3,167,707 A | 1/1965 | Oliver | |
| 3,423,671 A * | 1/1969 | Vezin | 324/347 |
| 3,685,158 A | 8/1972 | Planche | |
| 4,121,345 A * | 10/1978 | Roesner | 33/544.2 |
| RE32,070 E * | 1/1986 | Vezin | 324/347 |
| 4,588,951 A * | 5/1986 | Ohmer | 324/367 |
| 4,614,250 A | 9/1986 | Panetta et al. | |
| 4,757,873 A | 7/1988 | Linyaev et al. | |
| 4,857,831 A | 8/1989 | Davies et al. | |
| 4,862,090 A | 8/1989 | Vannier et al. | |
| 4,926,937 A | 5/1990 | Hademenos | |
| 4,979,585 A | 12/1990 | Chesnutt | |
| 5,022,484 A | 6/1991 | Panetta et al. | |
| 5,092,056 A | 3/1992 | Deaton | |
| 5,794,703 A * | 8/1998 | Newman et al. | 166/381 |
| 5,947,213 A | 9/1999 | Angle | |
| 6,026,911 A * | 2/2000 | Angle et al. | 175/24 |
| 6,112,809 A | 9/2000 | Angle | |
| 6,378,627 B1 * | 4/2002 | Tubel et al. | 175/24 |
| 6,702,010 B2 | 3/2004 | Yuratich et al. | |
| 6,815,954 B2 | 11/2004 | Jwanicki et al. | |
| 6,843,317 B2 * | 1/2005 | Mackenzie | 166/254.2 |

(Continued)

FOREIGN PATENT DOCUMENTS

| | | |
|---|---|---|
| EP | 0911483 | 4/1999 |
| EP | 1281834 | 2/2003 |

(Continued)

*Primary Examiner* — Jennifer H Gay
(74) *Attorney, Agent, or Firm* — Stephanie Chi; Jody DeStefanis

(57) ABSTRACT

The method and apparatus involves the positioning of an arm of a wellbore tool, such that the tool moves bidirectionally in a wellbore. Techniques also include predicting and acting in advance on the mechanism of an oilfield tool inside a wellbore, enhancing bidirectional movement and operation of the tool inside a wellbore environment typically for logging the well. Such regulation or control between different sensing parts may control placement of the sensors with respect to the wellbore wall.

3 Claims, 2 Drawing Sheets

(56) References Cited

U.S. PATENT DOCUMENTS

| | | | |
|---|---|---|---|
| 6,910,533 B2* | 6/2005 | Guerrero | 166/206 |
| 7,059,417 B2* | 6/2006 | Moore et al. | 166/381 |
| 7,069,775 B2 | 7/2006 | Fredette et al. | |
| 7,121,364 B2 | 10/2006 | Mock | |
| 7,131,210 B2 | 11/2006 | Fredette et al. | |
| 7,273,109 B2* | 9/2007 | Moore et al. | 166/381 |
| 7,281,578 B2* | 10/2007 | Nakajima et al. | 166/255.2 |
| 7,436,185 B2* | 10/2008 | Fredette et al. | 324/367 |
| 7,543,636 B2* | 6/2009 | Malone et al. | 166/252.4 |
| 7,748,476 B2* | 7/2010 | Krueger | 175/99 |
| 7,784,368 B2 | 8/2010 | Gibson et al. | |
| 7,975,541 B2* | 7/2011 | Large et al. | 73/152.57 |
| 8,156,799 B2 | 4/2012 | Maute et al. | |
| 2006/0230846 A1 | 10/2006 | Smith et al. | |
| 2009/0218105 A1* | 9/2009 | Hill et al. | 166/383 |
| 2009/0229820 A1 | 9/2009 | Saeed | |
| 2011/0048702 A1* | 3/2011 | Jacob | 166/254.2 |
| 2011/0048801 A1* | 3/2011 | Jacob | 175/45 |
| 2012/0048541 A1* | 3/2012 | Jacob | 166/254.2 |
| 2012/0048542 A1* | 3/2012 | Jacob | 166/254.2 |
| 2012/0055711 A1 | 3/2012 | Brannigan et al. | |
| 2012/0131996 A1* | 5/2012 | Anish et al. | 73/152.54 |

FOREIGN PATENT DOCUMENTS

| | | |
|---|---|---|
| GB | 2459368 | 10/2009 |
| WO | WO 95/21987 | 8/1995 |
| WO | WO 02/37052 | 5/2002 |
| WO | WO 02/070943 | 9/2002 |

* cited by examiner

METHOD AND APPARATUS FOR CONTROLLED BIDIRECTIONAL MOVEMENT OF AN OILFIELD TOOL IN A WELLBORE ENVIRONMENT

CROSS-REFERENCE TO RELATED APPLICATIONS

The present application is based on and claims priority to EP Application No. 09290658, filed Aug. 31, 2009. Applicant has also filed co-pending U.S. patent application Ser. No. (not yet assigned) entitled AN ANTILOCK DEVICE FOR USE WITH AN ARM SYSTEM FOR LOGGING A WELLBORE AND METHOD FOR USING SAME contemporaneously herewith, U.S. patent application Ser. No. (not yet assigned) entitled AN INTERLEAVED ARM SYSTEM FOR LOGGING A WELLBORE AND METHOD FOR USING SAME contemporaneously herewith, and U.S. patent application Ser. No. (not yet assigned) entitled AN ARM SYSTEM FOR LOGGING A WELLBORE AND METHOD FOR USING SAME contemporaneously herewith. The entire contents of each are herein incorporated by reference.

TECHNICAL FIELD

The present disclosure relates to tools introduced inside a wellbore for logging; more specifically, to a method and apparatus for logging for exploration or production with a tool containing one or multiple arms or extensions intended to touch or maintain close contact the wellbore wall, using the tool to log or measure the wellbore wall or formation and provide a signal to a controller which moves the arms or extensions to prevent damage to the arms from changes or obstructions in the wellbore and permit logging both going into and coming out of the wellbore.

BACKGROUND

This disclosure applies particularly to pad tools, caliper tools, sensing tools, and placement tools, where a mechanism permits the tool to modify its shape to move closer to the wellbore. The mechanism usually opens the link or arm using means either active (e.g., piston, screw, sliding link) or passive (e.g., spring, gravity, friction of wellbore, fluid movement). See, for example, U.S. Pat. No. 6,702,010 issued 9 Mar. 2004 to Yuratich et al. and U.S. Pat. No. 4,979,585 issued 25 Dec. 1990 to Chesnutt, for examples of various similar devices.

In the well logging art, the logging direction is usually unidirectional. This means that the tool sensing section is not symmetrical, having a preferred way of logging (usually upwards). Therefore, the logging can generally be performed in only one direction, usually during the ascent (or egress) and not during the descent (or ingress).

Being able to perform logging either during the descent, or ingress, has numerous advantages. These advantages are multiplied if logging can be performed both during ingress and egress from the wellbore. Applicant uses ascent and descent, or ingress and egress, to indicate relative longitudinal movement of the drill string and is not limited herein to up and down movement. The down in lateral horizontal wells can, in fact, be up. Moreover, longitudinal movement may, in fact, be lateral in a lateral well. In particular, logging during ingress of the wellbore permits the capture of a full repeat file; or, a combination file if the tool is operating properly both on ingress into the wellbore and egress from the wellbore. Logging during ingress permits data collection and verification during ingress, and increases the probability of identifying a problematic wellbore situation before a failure occurrence. This is particularly desirable in deviated or horizontal wells where tool failure has historically shown a higher probability to occur due to the conveying modes employed (drill pipe conveyed, tractor conveyed, coil-tubing convey, etc.), or due to experienced high pressure and temperature as the tool approaches Total Depth.

The apparatus and method of the current disclosure permits a tool, whether utilizing pad, caliper, sensing, or placement modalities, to adapt to the logging direction, thereby allowing an operator to log in both directions (ingress and egress) while also providing more accurate, less damaging, and more continuous contact of sensing devices on the arm or extension touching or osculating the wellbore wall.

BRIEF DESCRIPTION OF THE DRAWINGS

Various aspects and embodiments of the present disclosure are described below in the appended drawings to assist those of ordinary skill in the relevant art in making and using the subject matter hereof. In reference to the appended drawings, which are not intended to be drawn to scale, like reference numerals are intended to refer to identical or similar elements. For purposes of clarity, not every component may be labeled in every drawing.

FIG. 1A is a cross-sectional schematic view of an alternative embodiment of the tool in accordance with the present disclosure showing an alternative displacement of the first and second group of arms or extensions from the tool body.

SUMMARY OF THE DISCLOSURE

Figure 1:
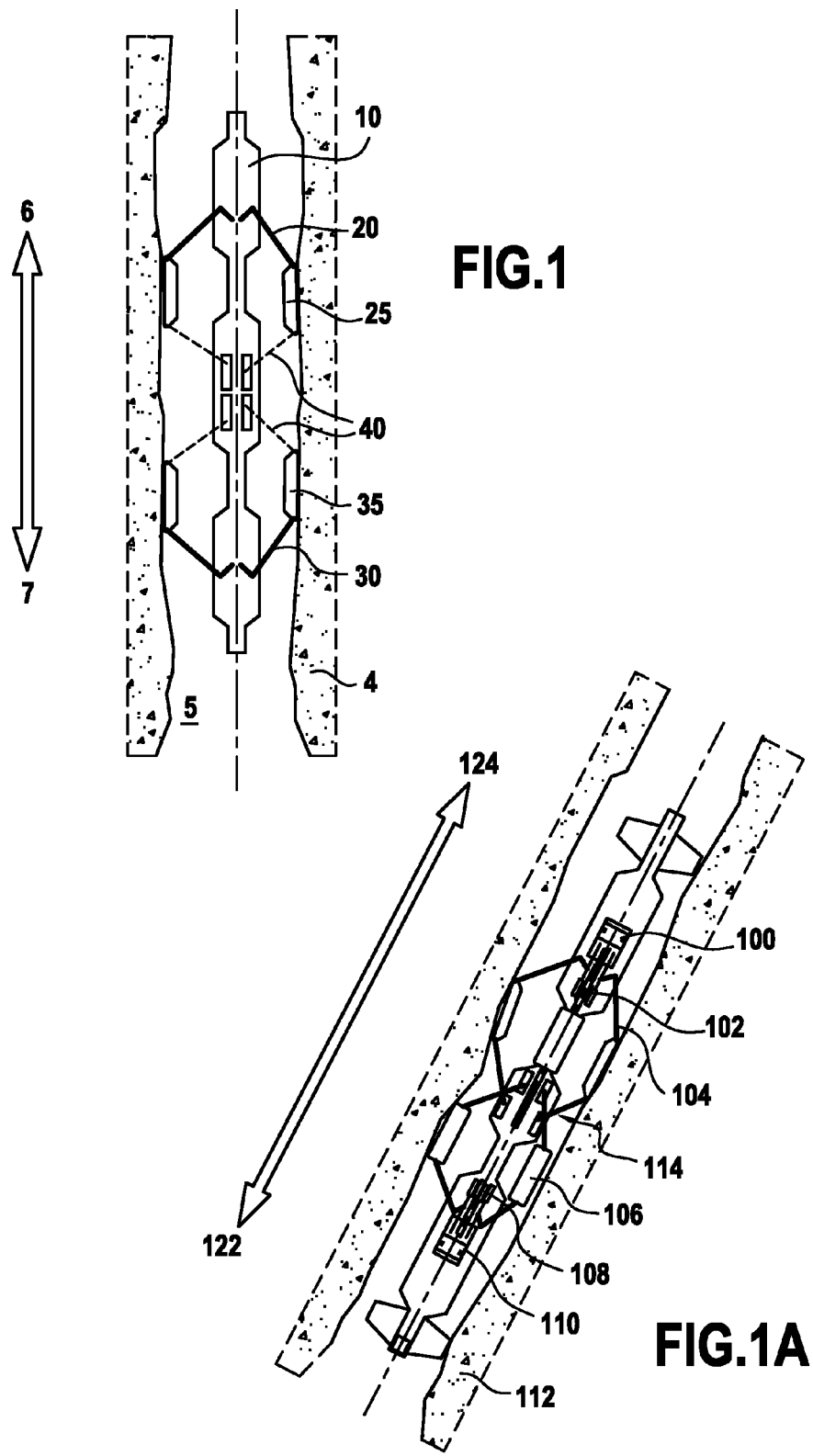
FIG. 1 is cross-sectional schematic view of an embodiment of the tool in accordance with the present disclosure showing the relative displacement of the first and second group of arms or extensions from the tool body.

According to an aspect of the present disclosure, a method for regulating an arm of a wellbore tool comprises the steps of conveying a tool having a plurality of adjustable wellbore wall-engaging arms in a wellbore; sensing a wellbore physical characteristic during conveyance of the tool at a leading portion of the tool in a direction of movement in the wellbore; and, controlling the adjustable wellbore wall-engaging arms utilizing the wellbore physical characteristic to regulate the position of the wall-engaging arms relative to the wellbore wall.

This method can also be accomplished when the tool is deployed and sensing both upon ingress and upon egress from the wellbore, and permit sensing a wellbore physical characteristic such as sensing a plurality of distances between the tool and the wellbore wall. This method can also be practiced by controlling the tool by determining the change of the wellbore physical characteristic at the leading portion of the wall-engaging arms in the direction of movement in the wellbore.

The wellbore tool comprises a tool body attached to a wellbore conveying means, said tool body having a first group of wall-engaging arms capable of determining a physical characteristic of the wellbore near the first group of wall-engaging arms, and a second group of wall-engaging arms capable of determining a differing physical characteristic of the wellbore near the second group of wall-engaging arms, and a control device utilizing the measured physical characteristic of the wellbore from the first group of wall-engaging arms to regulate the deployment of the second group of wall-engaging arms relative to the wellbore wall; the method further comprising the steps of conveying the wellbore tool in a direction of movement in the wellbore; sensing a physical characteristic of the wellbore near the first group of wall-engaging arms; and, controlling the second group of wall-engaging arms utilizing the measured physical characteristic of the wellbore near the first group of wall-engaging arms to regulate the position of the second group of wall-engaging arms relative to the wellbore wall.

A method for regulating an arm of a wellbore tool comprising the steps of deploying a tool having a plurality of adjustable wellbore wall-engaging arms in a wellbore; providing a plurality of wellbore physical characteristics to a control device of the tool; and, controlling the adjustable wellbore wall-engaging arms utilizing at least a portion of the plurality of wellbore physical characteristics to regulate the position of the wall-engaging arms relative to the wellbore wall. The method can further allow the plurality of wellbore physical characteristics be derived from a prior measurement of wellbore physical characteristics; and, again, providing measurement with the tool both upon ingress and upon egress from the wellbore. The method permits a plurality of wellbore physical characteristics to be captured, and can include a plurality of widths of the wellbore wall at a plurality of depths. This novel apparatus permits controlled bidirectional movement of an oilfield tool within a wellbore is assembled from a tool body deployed in a wellbore permitting longitudinal movement of the tool in the wellbore; a first group of one or more wellbore wall-engaging arms attached to a circumferential surface of the tool body providing sensors for measuring one or more physical characteristics of the wellbore; a second group of one or more wellbore wall-engaging arms attached to the circumferential surface of the tool body providing sensors for measuring one or more physical characteristics of the wellbore; and, a controller connected to the first group and the second group of wall-engaging arms using a signal from the sensors of the first group of wall-engaging arms to regulate the position of the second group of wall-engaging arms relative to the wellbore wall.

The deployment of the tool is accomplished in a wellbore by connecting the tool to a conveying mode selected from a group consisting of a drill string, a production string, a coil tubing string, a tool tractor, a wireline, a slickline, and the like for the purpose of moving the tool between the surface and a location in the wellbore. Moreover, the apparatus can be assembled with the first group and the second group of wall-engaging arms which can provide a sensing device selected from a group consisting of a pad tool, a caliper tool, a sensing tool, and a placement tool; and can provide an assembly wherein each sensing device is capable of providing a signal to activate an arm controlling mechanism.

This apparatus can also utilize an arm controlling mechanisms selected from a group consisting of a piston, a screw, a sliding link, a spring, electric motor and a hydraulic pressure actuator, to accomplish the same purpose. The apparatus can provide a control function wherein the first group and the second group of wall-engaging arms are urged into continuous engagement with the wellbore wall; or, the apparatus can be deployed to engage the sensors of the second group of wall-engaging arms to obtain a signal used by the controller to modify the position of the first group of wall-engaging arms upon ingress of the wellbore; or, activate the sensors of the first group of wall-engaging arms to provide a signal used by the controller to modify the position of the second group of wall-engaging arms upon egress from the wellbore. This apparatus can additionally provide the means to position of the first group of wall-engaging arms at a predetermined stand-off position between the wellbore wall and a pad of each wall-engaging arm of the first group. Similarly, the apparatus can position the second group of wall-engaging arms at a predetermined stand-off position between the wellbore wall and a pad of each wall-engaging arm of the second group.

DETAILED DESCRIPTION

As shown in FIG. 1, a regulation or control loop allowing logging or measuring or modification of the position of the arms or extensions of the sonde, or tool 10, is provided by a controller in or in communication with the tool 10 and permits logging in either or both directions for the tool with either pads or other sensing devices placed at the arm tip and in contact with the borehole surface. Close and continuous contact with wellbore 5 can be provided while preventing possible damage to the logging tool which can result from the failure to draw the arm(s) back into the tool body 10 when an obstruction or narrowing of the wellbore wall 4 in an open hole environment (as shown in FIGS. 1 and 1A) is detected by the leading sensor, which can be either upper sensor 25, lower sensor 35 (depending on the direction of movement), or a sensor located on the tool body 10 above, or below, the arms (depending on the direction of longitudinal movement).

As further shown in FIG. 1, the tool 10 is deployed in the wellbore 5 connected to a conveying means (not shown) for moving the tool 10 between the surface and a location in the wellbore 5. The tool 10 is shown as having both an upper arm set 20 (also referred to herein as a "first group of wall-engaging arms") and the lower arm set 30 (also referred to herein as a "second group of wall-engaging arms") engaging the wellbore wall 4. The term "wall-engaging," and variations thereof, as used herein with reference to the arms is meant to include both selective continuous engagement with the wellbore wall, as well as providing a fixed distance between the sensing device and the wellbore wall. The direction for ingress 7 and egress 6 are shown in FIG. 1. When ingressing 7 the wellbore 5, lower arm set 30 carries a sensor 35 which provides a signal to the controller in the tool 10 functionally detecting the condition, such as the multi-axial diameter of the wellbore, shape of the wellbore, or distances between the wellbore wall and the tool at/near the sensor 35, thereby permitting the following upper arm set 20 to be adjusted to move providing continuous osculation of the wellbore wall 4. Lower arm set 30, which can be resiliently moved against the wellbore wall 4 in a manner commonly used in this art area, reactively closes as it contacts obstructions near the wellbore wall 4 without damage to the tool.

Similarly, upon egress 6 from the wellbore 5, upper arm set 20 provides a sensor 25 signaling the controller to move the lower arm set 30 to again continuously osculate or alternatively move off of the wellbore wall 4 to avoid damage to the trailing arm set. Upper arm set 20, upon egress, reactively moves to close after contact upon encountering an obstruction in wellbore wall 4, again avoiding damage to the tool.

FIG. 1A shows an alternative to existing arm or extension attachment designs more fully described in a companion application titled Method and Apparatus for Symmetrical Pad Connection on a Dual Articulated Arm Assembly Enhancing Pad Movement and Sustained Pad Contact with Borehole, which application is incorporated herein by reference as if fully copied herein. The optional passive protection arms 40 shown in FIG. 1 provide an alternative means for implementation of the present disclosure, but are not required. The alternative passive arms 40 can be affixed in an overlapping arrangement as shown in FIG. 1A. FIG. 1A provides an upper group 104 of arms and pads affixed on a wellbore tool body and controlled by hydraulic means 100, which push calipers 102 outwardly to engage the wellbore 112. The lower arms of the upper group 104 are attached to the tool body at 114 and are interleaved with upper arms of a lower group 106. The lower group 106 of arms and pads may be moved by hydraulic means 110 acting on calipers 108, and the interleaving provides an advantage of minimal separation between the upper pads and the lower pads. This also permits the apparatus to be engaged either when moving into the wellbore 122 or out of the wellbore 124.

The method of an embodiment of the present disclosure results from a measurement made previously by the conveyed tool or any other source of information (previous run, another tool in the toolstring) providing controlling feedback to adjust the position of a fragile tool section (such as the arm tool or the pad tool), or a tool section requiring a precise positioning with respect to the wellbore wall. The potentially fragile tool section can be damaged if no action of closing/protecting is taken prior to passing over the wellbore irregularity or diameter changes. The precise positioning tool section may require a certain stand-off distance (i.e., a spaced apart distance between the wellbore wall and a pad) rather than full engagement with the wellbore wall. Also, as is known by well logging practitioners, even momentary catches restraining the movement of the sensor arm set can distort measurement readings or cause skipping of the arm over portions of the wellbore wall 4 in FIG. 1. The method can be symbolized as a regulation or control loop, either open or closed, disclosed in FIGS. 2 and 3.

Figure 2:
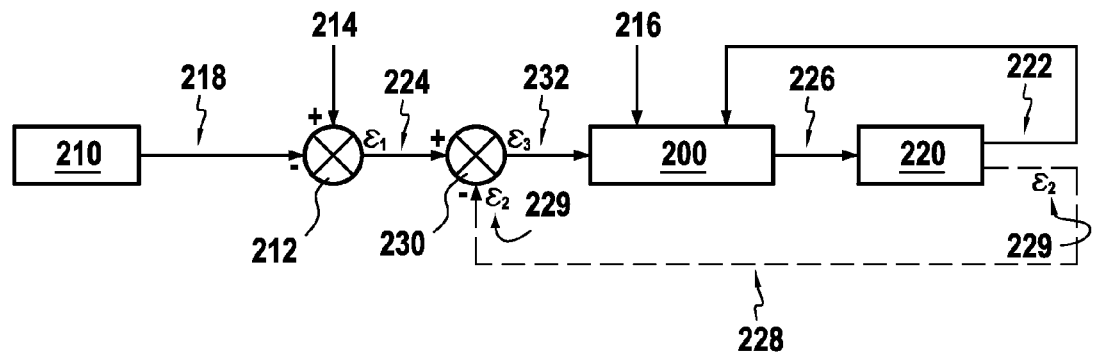
FIG. 2 is a schematic diagram of the controller actions of an embodiment of the present disclosure enabling logging upon egress from the wellbore.
Figure 3:
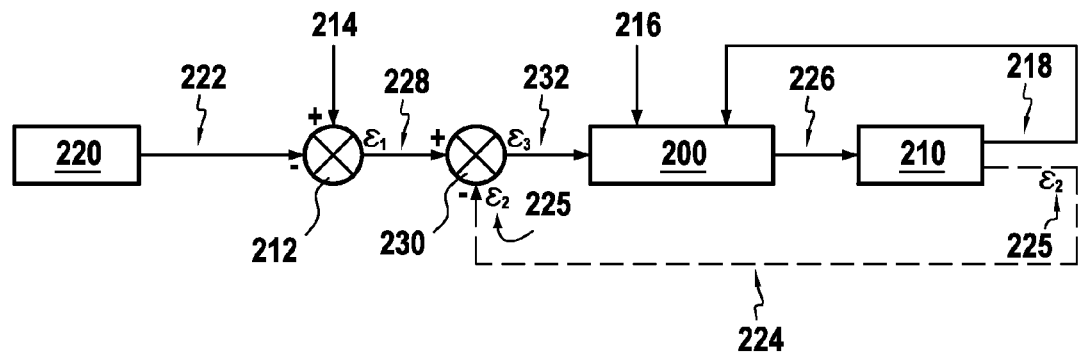
FIG. 3 is a schematic diagram of the controller actions of an embodiment of the present disclosure enabling logging upon ingressing the wellbore.

As shown in schematic representation of FIG. 2, the regulation or control of the disclosed apparatus starts with the methods described herein. Sensors disposed on an upper arm set can be described as Set 1 210 providing the input of the regulation or control system. Set 1 210 can consist of a single sensor or multiple sensors providing a matrix of input values for further processing by the controller 200. Moreover, Set 1 210 can be a device within the tool itself or represent input or signals derived from another source (e.g., different tool, previous logs). For a wellbore shape measurement, for example, Set 1 210 could be selected from any of the following types of sensors without departing from the spirit or intent of this disclosure: a caliper measurement, including multi-armed caliper tools; sonic tools; ultrasonic tools; or electromagnetic tools.

The data or signals detected schematically by Set 1 210 are described as measurement 1 218, information given by Set 1 210. Typically, this measurement is borehole shape, including multi-axis diameters, but can be other measured physical characteristics as well. This system also provides the ability to compare the data from actual measurement 218 with nominal values 214 inputted by the user of the system; such as expected measurement or average of previous measurements. These nominal conditions can be selected to describe correct tool operation or physical limits necessary for the tool operation. The combination of these two signals or data streams in adding point 212 results in variation $\epsilon_1$ 224 constituting the difference between measurement 1 218 and nominal values 214. This value can be functionally proportional to wellbore diameter variation, for example, and without limitation. Accordingly, variation $\epsilon_1$ 224 can represent borehole washouts, formation collapse or unconsolidated wellbore wall, casing/tubing entry, drilling diameter change, diameter irregularity when drilling, rock layer change, faults, or a whole array of other physical characteristics in the wellbore.

User input parameters (UIP) 216 can be determined by the user of the system and may describe the operating or policy limits predetermined by the user or the logging controller. These limits can be established in terms of variation or sampling speed, typically multi-axis diameter variation within a defined distance, rugosity limits, hole shape variation (like ovalization) and the like. Controller 200 utilizes the policy or operating parameters in a built-in interpretation device which, based on variation $\epsilon_1$ 224 and UIP 216 will decide or indicate what protective/corrective action 226 (represented as a signal to the Set 2 220 sensors) should be taken. Controller 200 can be fabricated using existing technology such as digital computers or programmable logic controllers (PLC), all in a manner well known in this art. Protective/corrective action 226 is primarily focused on protecting the hardware of Set 2 220 from possible damage or minimizing the possibility of hanging the tool body 10 (as shown in FIG. 1) in the wellbore on previously sensed obstructions. This action can be accomplished by generating a signal causing closure of the arms or extensions of the following arm set, retracting or covering of the sensor elements or any other action necessary to avoid possible damage to tool parts.

Set 2 220 is the recipient of the output of the regulation or control signals received from the controller 200. This is a device or collection of sensors within the tool that need to be protected. The sensing device of Set 2 220 can be similar or identical to those found in Set 1 210, offering the ability for this arrangement to be used both upon ingress and egress from the wellbore. A feedback signal may be used to (1) provide input to the controller 200 of measurement 2 222 to notify the controller 200 of the real position of Set 2 220 allowing the controller 200 to refine its protective/corrective action 226; or (2) to measure a variation $\epsilon_2$ 229 (such as standoff distance), which can be used to modify the input to the controller 200 through the feedback loop 228 into adding point 230 resulting in a modified variation $\epsilon_3$ 232 providing input to the controller 200. Typically, the variation $\epsilon_2$ 229 could be the distance between the sensing device of Set 2 220 and the borehole wall. This measurement would then be included in the regulation loop to modify variation $\epsilon_1$ 224. Therefore, in addition to the protective/corrective function, the controller can act to keep the device of Set 2 220 at a set distance from the formation (or in contact). This alternative closed loop regulation (marked in dashed-lines on the diagram) can therefore provide excellent sensing contact while protecting Set 2 220 from damage, or maintaining a fixed distance between the sensing device of Set 2 220 and the borehole wall.

As previously described, this method is the most flexible and provides the greatest versatility because the tool provides both symmetrical sensing and control between Set 1 210 and Set 2 220; and, while permitting each device in Set 1 210 or Set 2 210 to be selectively operational in a typical unidirectional manner—either up or down—inside a wellbore, in the manner presently provided by most tools, whether arm, pad or position sensing technologies.

A possible configuration of the apparatus of the present disclosure is a multi-arm tool with different closing directions for an upper arm set (Set 1) and a lower arm set (Set 2). When conveying upwards, Set 1 will give the measurement 1 (i.e., four-axis borehole radius), which will be compared to the nominal wellbore diameter or shape adjusted by a correction factor (provided by previous measurements). The output of this comparison is a set of values (i.e., nominal distance differences $\epsilon_1$ 224). Considering that Set 2 220 is currently logging wellbore characteristics while also sensing and recording data from its contact with the formation (i.e., when $\epsilon_2=0$), the controller 200 (in the tool body 10 or in communication therewith as shown in FIG. 1) analyzes both the variations of $\epsilon_1$ 224 and deviations from UIP 216. If the user limit is exceeded (i.e. wellbore shape variation higher than set value per foot), the protective/corrective action 226 of closing the arm of Set 2 220 begins. While closing the arms, standoff measurements ($\epsilon_2$) 229 are evaluated (i.e., from a pad measurement) and the controller can initiate an adjustment by reopening or reclosing the arms. Contact of the sensing device with the wellbore for improved logging can therefore be achieved while avoiding damage. As soon as variations $\epsilon_1$ 224 and a measurement 2 222 or $\epsilon_2$ 229 dip below the user-set limits of the UIP 216, the protective/corrective actions stop, since the Set 2 contact is within the appropriate limits with no risk of damage to the arm or the tool body.

When conveying upon ingress or downwards, the opposite steps occur as Set 2 220 provides the measurement providing input for the regulation of Set 1 210 as on the following or trailing arm set. As more fully shown in FIG. 3, the logging device equipped or enabled by this embodiment allows logging, measuring, or moving indifferent to the direction of movement of the tool in the wellbore. While logging upon ingress, lower arm set 30 (as shown in FIG. 1) senses wellbore wall obstructions and other physical conditions such as the diameter at Set 2 220. A signal or measurement 2 222 is sent to the controller 200 after comparison with nominal values 214 previously loaded in the apparatus as described above. Variation $\epsilon_2$ 228 is calculated at adding point 212 providing input to the controller 200. Serious deviations, as determined from the policy parameters UIP 216 inserted by the user allow the calculation providing protective/corrective actions 226 for use by the Set 1 device 210 moving or adjusting the arm or extension controlled. As before, Set 1 210 can provide a feedback signal that can be used to (1) provide input to the controller 200 of measurement 1 218 to notify the controller 200 of the real position of Set 1 210 allowing the controller 200 to refine its protective/corrective action 226; or (2) to measure a variation $\epsilon_1$ 225 (such as standoff distance), which can be used to modify the input to the controller 200 through the feedback loop 224 into adding point 230 resulting in a modified variation $\epsilon_3$ 232 providing input to the controller 200. The device can be equipped, for example, with pads or sensing devices placed at the arm tip and in contact with the wellbore wall surface. In addition, enhanced contact with the wellbore wall while preventing possible damage can be provided with this second form of regulation, or feedback loop 224 upon ingress of the tool. Thus, the method provides a means of measurement of wellbore wall conditions and adjustment of the logging arms or extensions to avoid damage to the sensors, maintain a portion of the tool in a fixed distance from the wellbore wall, or prevent sticking of the tool on both ingress and egress of the tool from the wellbore.

Normal tool conveyance speed when logging is usually around 1800 ft/hr (15 cm/sec.) The distance between the two sets of arms (the upper 20 and the lower 30 in FIG. 1) of between 50 cm to 1 m creates a reaction time of at least 3 seconds for the protective/corrective action. The protective/corrective action could also be linked with a warning or a decrease in the conveying speed, allowing a longer time for the regulation process to take effect.

Numerous other embodiments and alternatives thereof have been disclosed. While the above disclosure includes the best mode for carrying out the invention as contemplated by the named inventors, not all possible alternatives have been disclosed. For that reason, the scope and limitation of the present invention is not to be restricted to the above disclosure, but is instead to be defined and construed by the appended claims.

What is claimed is:

1. A method for regulating an arm of a wellbore tool comprising the steps of:
conveying a wellbore tool having a plurality of adjustable wellbore wall-engaging arms in a wellbore, wherein the wellbore tool comprises a tool body attached to a wellbore conveying mean;
wherein the tool body comprises a control device utilizing the measured physical characteristic of the wellbore from the first group of wall-engaging arms to regulate the deployment of the second group of wall-engaging arms relative to the wellbore wall; and
wherein the plurality of adjustable wellbore wall-engaging arms comprises a first group of wall-engaging arms capable of determining a physical characteristic of the wellbore near the first group of wall-engaging arms, and a second group of wall-engaging arms capable of determining a differing physical characteristic of the wellbore near the second group of wall-engaging arms;
sensing a wellbore physical characteristic during conveyance of the wellbore tool at a leading portion of the wellbore tool in a direction of movement in the wellbore; and,
controlling the adjustable wellbore wall-engaging arms utilizing the wellbore physical characteristic to regulate the position of the wall-engaging arms relative to the wellbore wall,
conveying the wellbore tool in a direction of movement in the wellbore;
sensing a physical characteristic of the wellbore during conveyance of the wellbore tool near the first group of wall-engaging arms; and,
controlling the second group of wall-engaging arms utilizing the measured physical characteristic of the wellbore near the first group of wall-engaging arms to regulate the position of the second group of wall-engaging arms relative to the wellbore wall.

2. An apparatus permitting controlled bidirectional movement of a tool during conveyance of the tool within a wellbore comprising:
a tool body deployed in a wellbore permitting longitudinal movement of the tool in the wellbore;
a first group of one or more wellbore wall-engaging arms attached to a circumferential surface of the tool body providing sensors for measuring one or more physical characteristics of the wellbore;
a second group of one or more wellbore wall-engaging arms attached to the circumferential surface of the tool body providing sensors for measuring one or more physical characteristics of the wellbore,
wherein the sensors of the second group of wall-engaging arms provide a signal used by the controller to modify the position of the first group of wall-engaging arms upon ingress of the wellbore; and
a controller connected to the first group and the second group of wall-engaging arms using a signal from the sensors of the first group of wall-engaging arms to regulate the position of the second group of wall-engaging arms relative to the wellbore wall.

3. An apparatus permitting controlled bidirectional movement of a tool during conveyance of the tool within a wellbore comprising:

a tool body deployed in a wellbore permitting longitudinal movement of the tool in the wellbore;

a first group of one or more wellbore wall-engaging arms attached to a circumferential surface of the tool body providing sensors for measuring one or more physical characteristics of the wellbore, wherein the sensors of the first group of wall-engaging arms provide a signal used by the controller to modify the position of the second group of wall-engaging arms upon egress from the wellbore a second group of one or more wellbore wall-engaging arms attached to the circumferential surface of the tool body providing sensors for measuring one or more physical characteristics of the wellbore; and a controller connected to the first group and the second group of wall-engaging arms using a signal from the sensors of the first group of wall-engaging arms to regulate the position of the second group of wall-engaging arms relative to the wellbore wall.

* * * * *